US007778471B2

(12) United States Patent
Kim et al.

(10) Patent No.: US 7,778,471 B2
(45) Date of Patent: Aug. 17, 2010

(54) DYNAMIC CAPACITANCE COMPENSATION APPARATUS AND METHOD FOR LIQUID CRYSTAL DISPLAY

(75) Inventors: Wooshik Kim, Yongin-si (KR); Daesung Cho, Seoul (KR); Seungwoo Lee, Seoul (KR); Sangjo Lee, Suwon-si (KR); Dmitri Birinov, Yongin-si (KR); Woochul Kim, Uijeongbu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1279 days.

(21) Appl. No.: 11/300,315

(22) Filed: Dec. 15, 2005

(65) Prior Publication Data

US 2006/0139287 A1 Jun. 29, 2006

(30) Foreign Application Priority Data

Dec. 29, 2004 (KR) ..................... 10-2004-0115072

(51) Int. Cl.
*G06K 9/36* (2006.01)

(52) U.S. Cl. ...................................................... 382/232

(58) Field of Classification Search ......... 382/232-233, 382/236, 238-240, 244-253; 375/240.12-240.24; 348/394.1-416.1, 420.1, 421.1
See application file for complete search history.

(56) References Cited

U.S. PATENT DOCUMENTS

| | | | | |
|---|---|---|---|---|
| 6,157,740 | A * | 12/2000 | Buerkle et al. | 382/233 |
| 6,181,823 | B1 * | 1/2001 | Takahashi | 382/232 |
| 6,363,119 | B1 * | 3/2002 | Oami | 375/240.03 |
| 6,876,769 | B2 * | 4/2005 | Nakaya | 382/236 |
| 7,227,896 | B2 * | 6/2007 | Sun | 375/240.16 |
| 7,492,950 | B2 * | 2/2009 | Suzuki et al. | 382/232 |
| 7,580,584 | B2 * | 8/2009 | Holcomb et al. | 382/239 |

* cited by examiner

*Primary Examiner*—Jose L Couso
(74) *Attorney, Agent, or Firm*—Staas & Halsey LLP

(57) ABSTRACT

A dynamic capacitance compensation (DCC) apparatus and method for a liquid crystal display (LCD). The apparatus includes a one-dimensional block-encoding unit reading pixel values of an image in line units, dividing the pixel values of the read image into one-dimensional blocks in predetermined pixel units, transforming and quantizing the one-dimensional blocks, and generating bit streams; a memory storing the generated bit streams; a one-dimensional block-decoding unit which decodes the bit streams stored in the memory by inverse quantization and inverse transform; and a compensation pixel value-detecting unit detecting a compensation pixel value for each pixel based on a difference between each pixel value of a current frame and each pixel value of a previous frame decoded by the one-dimensional block-decoding unit.

56 Claims, 12 Drawing Sheets

DYNAMIC CAPACITANCE COMPENSATION APPARATUS AND METHOD FOR LIQUID CRYSTAL DISPLAY

CROSS-REFERENCE TO RELATED APPLICATION

This application claims the priority of Korean Patent Application No. 10-2004-0115072, filed on Dec. 29, 2004, in the Korean Intellectual Property Office, the disclosure of which is incorporated herein by reference.

BACKGROUND OF THE INVENTION

1. Field of the Invention

The present invention relates to dynamic capacitance compensation (DCC) for a liquid crystal display (LCD), and more particularly, to a DCC compensation apparatus and method for an LCD, which can easily process image data in real time, reduce the number of memories, and hardly suffer from degradation of image quality.

2. Description of Related Art

A liquid crystal display (LCD) injects a liquid crystal between two sheets of glass, applies electrical pressure thereto, and displays characters/images using optical changes that occur when the sequence of the crystal liquid molecules is changed by the electrical pressure. LCDs operate on 1.5V-2V and are widely used in watches, calculators, and laptop computers due to low power consumption.

One of the disadvantages of LCDs is slow response time. The slow response time causes values of previous and current images to be combined, resulting in a blurring phenomenon. Generally, one frame lasts approximately 16.7 ms. When voltage is applied to both ends of liquid crystal material, it takes time for the liquid crystal material to respond. Therefore, time delay is required to express a desired pixel value and such time delay causes blurring.

To improve response time of LCDs, a dynamic capacitance compensation (DCC) method is used. In DCC, the difference between a pixel value of a previous frame and a pixel value of a current frame is calculated, a value proportional to the difference to the pixel value of the current frame is added, and the result of addition is outputted. To perform DCC, pixels values of the previous frame must be stored in a memory.

However, a writing memory for storing the pixel values of the previous frame and a reading memory for reading the stored pixel values are required to store the pixel values of the previous frame without compression. In other words, independent writing and reading memories must be installed to smoothly perform the DCC by storing the uncompressed pixel values of the previous frame in the writing and reading memories.

To relieve the burden of having to install two or more memories, compressing image data may be considered. In other words, a bit stream of the pixel values of the previous frame is compressed using an encoder and stored in a memory, and the compressed bit stream is decoded using a decoder. Then, the pixel values of the previous frame are compared with the pixel values of the current frame to perform the DCC.

A color sampling compression method has been used to compress pixel values of a previous frame. In the color sampling compression method, the pixel values of the previous frame are compressed through YcbCr conversion and down-sampling processes. Here, Y denotes luminance, and Cb and Cr denote chrominance. However, the color sampling compression method changes color and has poor compression efficiency.

In this regard, to perform the DCC, conventional LCDs store the pixel values of the previous frame without compression or compress the pixel values of the previous frame through the color sampling compression, running the risk of compromising image quality.

BRIEF SUMMARY

An aspect of the present invention provides a dynamic capacitance compensation (DCC) apparatus of a liquid crystal display (LCD), which can encode and decode image data in line units.

An aspect of the present invention also provides a DCC compensation method for an LCD, which can encode and decode image data in line units.

According to an aspect of the present invention, there is provided a dynamic capacitance compensation (DCC) apparatus for a liquid crystal display (LCD), the apparatus including: a one-dimensional block-encoding unit reading pixel values of an image in line units, dividing the pixel values of the read image into one-dimensional blocks in predetermined pixel units, transforming and quantizing the one-dimensional blocks, and generating bit streams; a memory storing the generated bit streams; a one-dimensional block-decoding unit which decodes the bitstreams stored in the memory by inverse quantization and inverse transform; and a compensation pixel value-detecting unit detecting a compensation pixel value for each pixel based on a difference between each pixel value of a current frame and each pixel value of a previous frame decoded by the one-dimensional block-decoding unit.

According to another aspect of the present invention, there is provided a dynamic capacitance compensation (DCC) method for a liquid crystal display (LCD), the method including: reading pixel values of an image in line units, dividing the pixel values of the read image into one-dimensional blocks in predetermined pixel units, transforming and quantizing the one-dimensional blocks, and generating bit streams; storing the generated bit streams in a memory; inversely quantizing and inversely transforming the bit streams stored in the memory and decoding the inversely quantized and inversely transformed bit streams; and detecting a compensation pixel value for each pixel based on a difference between each pixel value of a current frame and each pixel value of a previous frame.

According to another embodiment of the present invention, there is provided a method of improving a response time of a liquid crystal display using dynamic capacitance compensation, the method including: reading pixel values of an image in line units, dividing the read pixel values into one-dimensional blocks in predetermined pixel units, transforming and quantizing the one-dimensional blocks, and generating bit streams; storing the generated bit streams; inversely quantizing and inversely transforming the stored bit streams and decoding the inversely quantized and inversely transformed bit streams; and detecting a compensation pixel value for each pixel of the decoded bit streams based on a difference between each pixel value of a current frame and each pixel value of a previous frame.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
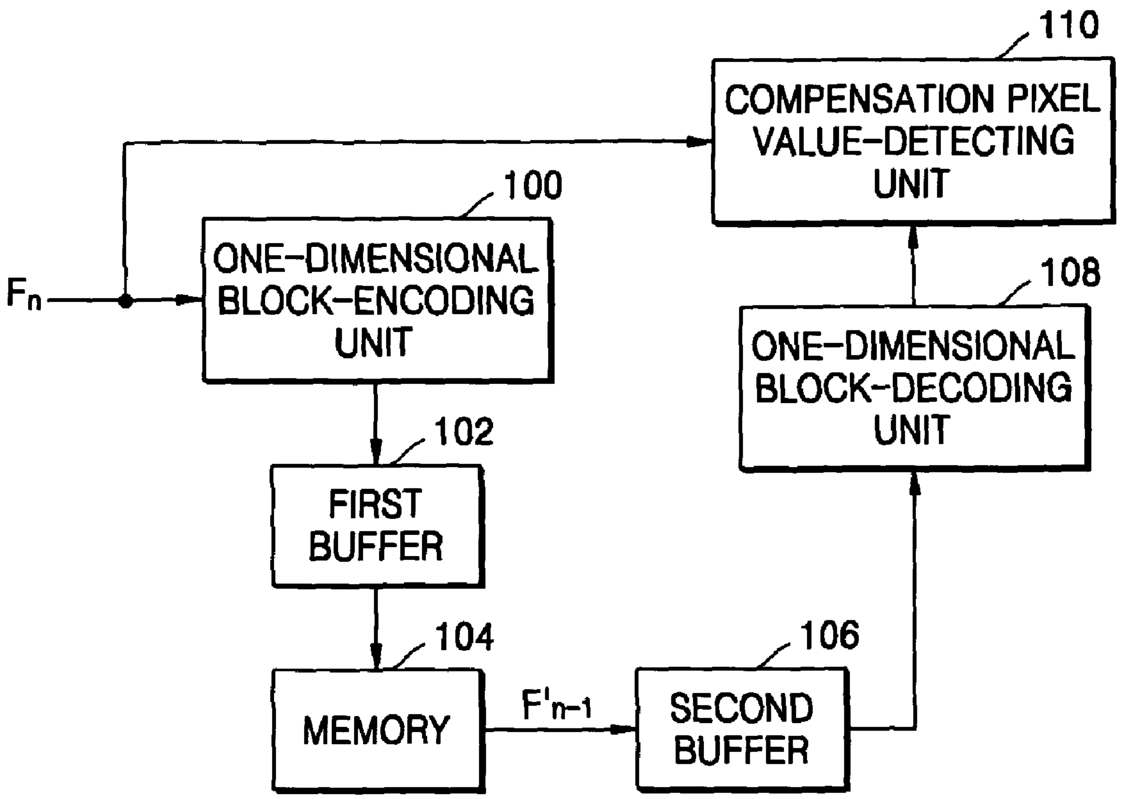
FIG. 1 is a block diagram of a dynamic capacitance compensation (DCC) apparatus of a liquid crystal display (LCD) according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a dynamic capacitance compensation (DCC) apparatus of a liquid crystal display (LCD) according to an embodiment of the present invention. Referring to FIG. 1, the apparatus includes a one-dimensional block-encoding unit 100, a first buffer 102, a memory 104, a second buffer 106, a one-dimensional block-decoding unit 108, and a compensation pixel value-detecting unit 110.

The one-dimensional block-encoding unit 100 reads pixel values of an image in line units, divides the pixel values in predetermined pixel units into one-dimensional blocks, transforms and quantizes the one-dimensional blocks, and generates bit streams. One-dimensional blocks refer to blocks into which pixel values of an image read in line units are divided in predetermined pixel units.

Figure 2A:
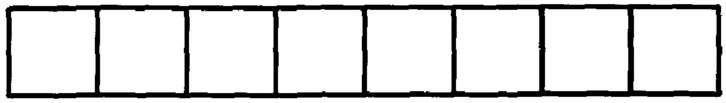
FIGS. 2A and 2B illustrate examples of one-dimensional blocks.
Figure 2B:
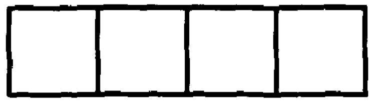

FIGS. 2A and 2B illustrate examples of one-dimensional blocks. FIG. 2A indicates an 8×1 one-dimensional block, and FIG. 2B indicates a 4×1 one-dimensional block. Referring to FIGS. 2A and 2B, the 8×1 one-dimensional block and the 4×1 one-dimensional block are obtained by dividing image data, which is input in line units, in 8 pixel units and 4 pixel units, respectively. The image data input in line units may also be divided into one-dimensional blocks in various pixel units.

The one-dimensional block-encoding unit 100 reads pixel values of a current frame $F_n$ in line units, divides the pixel values in 4 or 8 pixel units into one-dimensional blocks, encodes the one-dimensional blocks, and outputs the encoded one-dimensional blocks to the first buffer 102.

Figure 3:
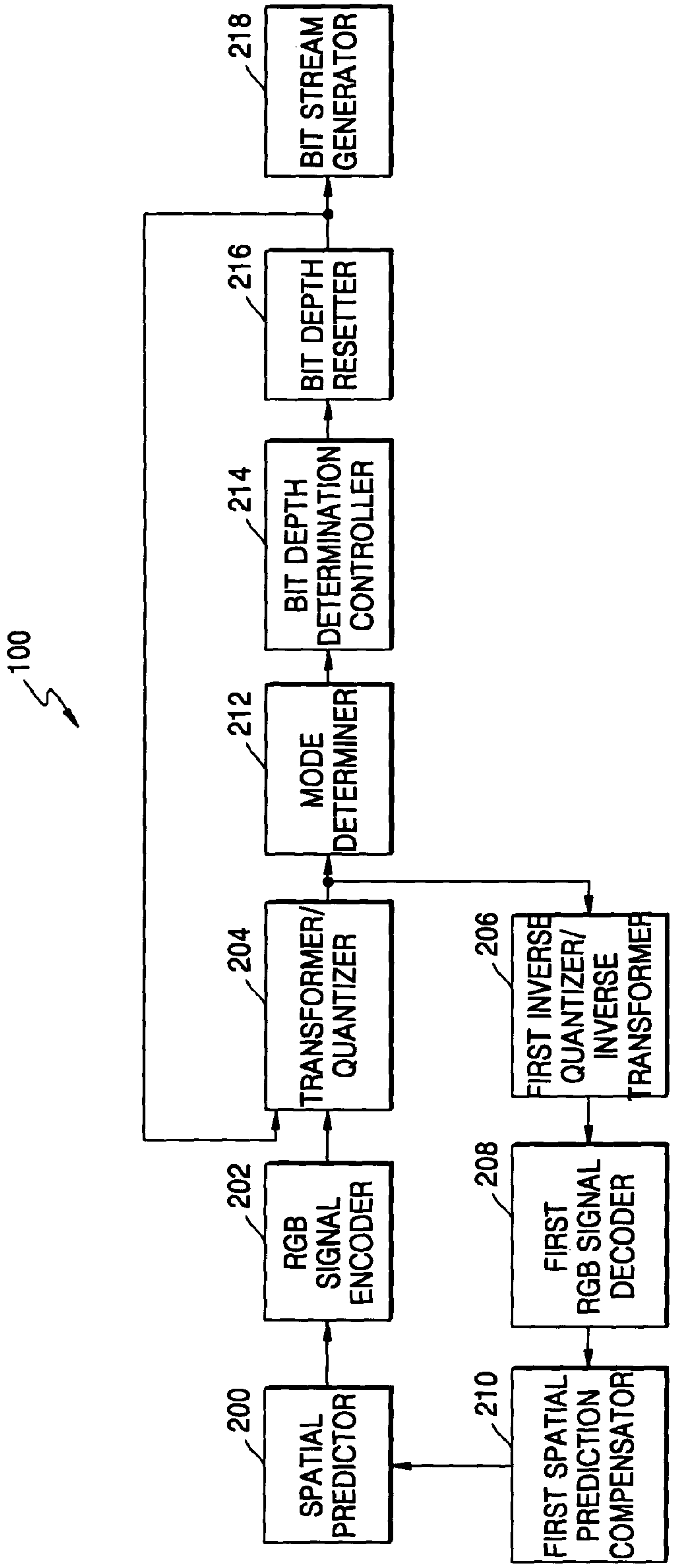
FIG. 3 is a detailed block diagram of a one-dimensional block-encoding unit of FIG. 1 according to an embodiment of the present invention.

FIG. 3 is a detailed block diagram of the one-dimensional block-encoding unit 100 of FIG. 1 according to an embodiment of the present invention. Referring to FIG. 3, the one-dimensional block-encoding unit 100 includes a spatial predictor 200, an RGB signal encoder 202, a transformer/quantizer 204, a first inverse quantizer/inverse transformer 206, a first RGB signal decoder 208, a first spatial prediction compensator 210, a mode determiner 212, a bit depth determination controller 214, a bit depth resetter 216, and a bit stream generator 218.

The spatial predictor 200 spatially predicts pixel values of a one-dimensional block using blocks adjacent to the one-dimensional block and outputs the spatially predicted pixel values to the RGB signal encoder 202. The process of removing spatial redundancy of a one-dimensional block using blocks spatially adjacent to the one-dimensional block is called spatial prediction (referred to as intra prediction). In other words, spatially predicted pixel values are obtained by estimating a prediction direction based on blocks adjacent to a one-dimensional block for each R, G and B color component. The spatial predictor 200 removes spatial redundancy between a current block and its adjacent blocks using the result of spatial prediction compensation output from the first spatial prediction compensator 210, that is, using restored blocks in a current image.

In particular, the spatial predictor 200 spatially predicts a one-dimensional block using only pixel values of blocks in a row above a row where the one-dimensional block is.

Figure 4:
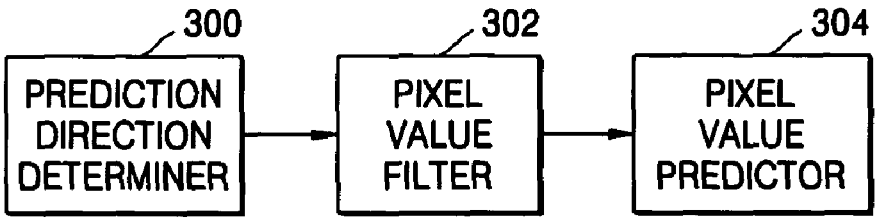
FIG. 4 is a detailed block diagram of a spatial predictor of FIG. 3 according to an embodiment of the present invention.

FIG. 4 is a detailed block diagram of the spatial predictor 200 of FIG. 3 according to an embodiment of the present invention. Referring to FIG. 4, the spatial predictor 200 includes a prediction direction determiner 300, a pixel value filter 302, and a pixel value predictor 304.

When determining a spatial prediction direction using blocks adjacent to a one-dimensional block, the prediction direction determiner 300 determines the spatial prediction direction using pixel values of blocks in a row above a row where the one-dimensional block is and outputs the determined spatial prediction direction to the pixel value filter 302.

Figure 5A:
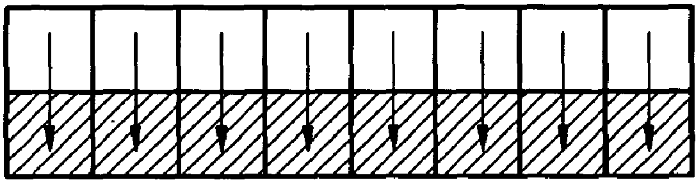
FIGS. 5A through 5 C illustrate examples of prediction directions of an 8×1 block, which corresponds to a one-dimensional block.
Figure 5B:
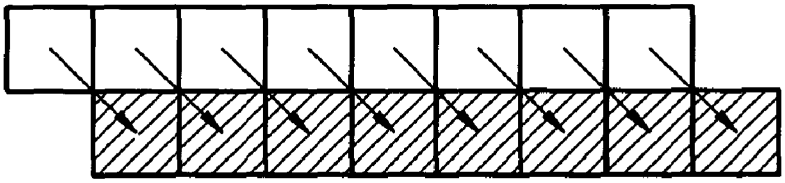
Figure 5C:
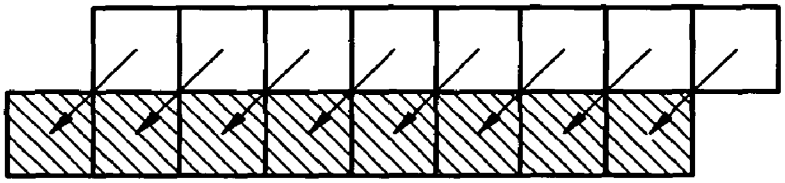

FIGS. 5A through 5C illustrate examples of prediction directions of an 8×1 block, which corresponds to a one-dimensional block. FIG. 5A illustrates a vertical spatial prediction direction of the 8×1 block. FIG. 5B illustrates a right diagonal spatial prediction direction of the 8×1 block. FIG. 5C illustrates a left diagonal spatial prediction direction of the 8×1 block. The spatial prediction directions of the one-directional block illustrated in FIGS. 5A through 5C are just examples. Various spatial prediction directions may also be suggested.

Figure 6:
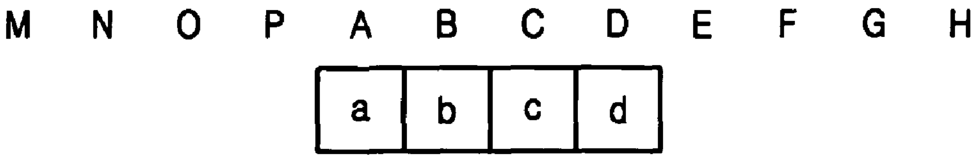
FIG. 6 illustrates an example of pixel values of a 4×1 one-dimensional block and pixel values of blocks in a row above a row where the 4×1 one-dimensional block is.

FIG. 6 illustrates an example of pixel values of a 4×1 one-dimensional block and pixel values of blocks in a row above a row where the 4×1 one-dimensional block is. Four methods of determining a spatial prediction direction using pixel values of blocks adjacent to the 4×1 one-dimensional block will now be described.

Referring to FIGS. 4 through 6, in a first method, the prediction direction determiner 300 calculates sums of differences between pixel values of the 4×1 one-dimensional block and pixel values of a block in the row above the row where the 4×1 one-dimensional block is for the respective RGB components in each direction. Among the sums of the differences, the prediction direction determiner 300 determines a direction having a minimum sum as the spatial prediction direction.

Referring to FIG. 6, in a vertical direction, the differences between the pixel values of the 4×1 one-dimensional block and the pixel values of the block in the row above the row where the 4×1 one-dimensional block exists are a'=a-A, b'=b-B, c'=c-C, and d'=d-D, respectively. It is assumed that sums of the differences in the vertical direction for the R, G and B components are $S_1$, $S_2$, and $S_3$, respectively.

In a right diagonal direction, the differences between the pixel values of the 4×1 one-dimensional block and the pixel values of the block in the row above the row where the 4×1 one-dimensional block exists are a'=a-P, b'=b-A, c'=c-B, and d'=d-C, respectively. It is assumed that sums of the differences in the right diagonal direction for the R, G and B components are $S_4$, $S_5$, and $S_6$, respectively.

In a left diagonal direction, the differences between the pixel values of the 4×1 one-dimensional block and the pixel values of the block in the row above the row where the 4×1 one-dimensional block exists are a'=a-B, b'=b-C, c'=c-D, and d'=d-E, respectively. It is assumed that sums of the differences in the left diagonal direction for the R, G and B components are $S_7$, $S_8$, and $S_9$, respectively.

Prediction directions having minimum sums for the R, G and B components are determined as spatial prediction directions for the R, G and B components, respectively. In other words, a prediction direction having a minimum value among $S_1$, $S_4$, and $S_7$ is determined as the prediction direction for the component R. Likewise, a prediction direction having a minimum value among $S_2$, $S_5$, and $S_8$ is determined as the prediction direction for the component G. A prediction direction having a minimum value among $S_3$, $S_6$, and $S_9$ is determined as the prediction direction for the component B.

In a second method, the prediction direction determiner 300 calculates sums of the differences between the pixel values of the 4×1 one-dimensional block and the pixel values of the block in the row above the row where the 4×1 one-dimensional block is, and calculates a direction determination value in consideration of a compression rate for each direction. The prediction direction determiner 300 determines a direction having a minimum value among the calculated direction determination values as a spatial prediction direction. The prediction direction determiner 300 obtains direction determination values using $$C=D+\lambda R, \quad (1)$$

where C denotes a direction determination value for each direction, D denotes a sum of differences between pixel values of a current block and pixel values of a block adjacent to the current block for each direction, λ denotes a predetermined constant value, and R denotes a compression rate for each direction.

In a third method, the prediction direction determiner 300 calculates the sums of the differences between the pixel values of the 4×1 one-dimensional block and the pixel values of the block in the row above the row where the 4×1 one-dimensional block is for the respective R, G and B components. Then, the prediction direction determiner 300 calculates sums of the sums of the differences for the R, G and B components and determines a prediction direction having a minimum sum among the sums of the sums of the differences as a direction for spatial prediction.

For example, as illustrated in FIG. 6, it is assumed that the sums of the differences between the pixel values of the 4×1 one-dimensional block and the pixel values of the block in the row above the row where the 4×1 one-dimensional block is for the respective R, G and B components are $S_1$, $S_2$, $S_3$, $S_4$, $S_5$, $S_6$, $S_7$, $S_8$, and $S_9$. Since the sums of the differences for the R, G and B components in the vertical direction are $S_1$, $S_2$, and $S_3$, respectively, a sum of $S_1$, $S_2$, and $S_3$ is $S_V=S_1+S_2+S_3$. Also, since the sums of the differences for the R, G and B components in the right diagonal direction are $S_4$, $S_5$, and $S_6$, respectively, a sum of $S_4$, $S_5$, and $S_6$ is $S_R=S_4+S_5+S_6$. Also, since the sums of the differences for the R, G and B components in the left diagonal direction are $S_7$, $S_8$, and $S_9$, respectively, a sum of $S_7$, $S_8$, and $S_9$ is $S_L=S_7+S_8+S_9$. A prediction direction having a minimum sum among the sums ($S_V$, $S_R$, and $S_L$) is determined as a spatial prediction direction.

When calculating a sum of the sums of the differences for the respective R, G and B components, a different weight may be given to each of the R, G and B components. For example, when $S_1$ is a sum of the differences between the pixel values of the 4×1 one-dimensional block and the pixel values of the block in the row above the row where the 4×1 one-dimensional block is for the component R, $S_2$ is a sum of the differences for the component G, and $S_3$ is a sum of the differences for the component B, a sum of $S_1$, $S_2$, and $S_3$ may be calculated by applying different weights to $S_1$, $S_2$, and $S_3$. In other words, the sum of $S_1$, $S_2$, and $S_3$ may be $S_V=0.3\square S_1+0.6\square S_2+0.1\square S_3$. The reason why different weights are given to $S_1$, $S_2$, and $S_3$ is that the processing of the component G is important to an image. The weights described above are merely examples, and various weights can be applied to $S_1$, $S_2$, and $S_3$.

In a fourth method, the prediction direction determiner 300 calculates the sums of the differences between the pixel values of the 4×1 one-dimensional block and the pixel values of the block in the row above the row where the 4×1 one-dimensional block is for the respective R, G and B components and obtains a direction determination value in consideration of a compression rate for each direction. The prediction direction determiner 300 determines a direction having a minimum value among the obtained direction determination values as a spatial prediction direction. The prediction direction determiner 300 obtains direction determination values using Equation 1 described above.

The pixel value filter 302 filters the pixel values of the blocks in the row above the row where the one-dimensional block is and outputs the filtered pixel values to the spatial predictor 304. Such filtering is required to prevent degradation of image quality caused by the spatial prediction performed using only the pixel values of the blocks in the row above the row where the one-dimensional block is.

A filtering method will now be described with reference to FIGS. 4 through 6. If the vertical direction is determined as the spatial prediction direction, the pixel value filter 302 filters a pixel value A, which is used for the spatial prediction, using an average value of pixel values adjacent to the right and left of the pixel value A. For example, one of pixel values (P+B)/2, (P+2A+B)/4, (2O+3P+6A+3B+2C)/16, and etc. obtained by the pixel value filter 302 is used as the pixel value A for the spatial prediction. Similarly, the pixel value filter 302 obtains one of pixel values (A+C)/2, (A+2B+C)/4, (2P+3A+6B+3C+2D)/16, and etc. used for the spatial prediction.

Other pixel values of the blocks in the row above the row where the one-dimensional block is are also filtered as described above. The filtering method described above is just an example, and pixel values of more adjacent blocks may be used in the filtering process.

The pixel value predictor 304 spatially predicts the pixel values of the one-dimensional block using only the blocks in the row above the row where the one-dimensional block is. For example, the pixel value predictor 304 spatially predicts the pixel values of the one-dimensional block in one of the vertical direction, the right diagonal direction, and the left diagonal direction determined by the prediction direction determiner 300.

As shown in FIGS. 5A through 5C, FIG. 5A illustrates the vertical spatial prediction direction of the 8×1 block. FIG. 5B illustrates the right diagonal spatial prediction direction of the 8×1 block. FIG. 5C illustrates the left diagonal spatial prediction direction of the 8×1 block. A variety of spatial prediction directions may be suggested in addition to the spatial prediction directions of the 8×1 one-dimensional block shown in FIGS. 5A through 5C.

Returning to FIG. 3, the RGB signal encoder 202, which receives the spatially predicted pixel values of the one-dimensional block from the pixel value predictor 304, removes redundant information from the spatially predicted pixel values of the one-dimensional block for the R, G and B components, encodes an RGB signal having the redundant information removed, and outputs the encoded RGB signal to the converter/quantizer 204. The RGB signal encoder 202 removes the redundant information using the correlation between the spatially predicted pixel values for the R, G and B components and encodes the RGB signal without the redundant pixel values.

The transformer/quantizer 204 transforms and quantizes pixel values of each one-dimensional block, and outputs the converted and quantized spatially predicted pixel values to the first inverse quantizer/inverse transformer 206 and the mode determiner 212. Orthogonal transform encoding is used to convert spatially predicted pixel values of each one-dimensional block. In the orthogonal transform encoding, a fast Fourier transform (FFT), a discrete cosine transform (DCT), a Karhunen-Loeve transform (KLT), a Hadamard transform, and a slant transform are widely used.

In particular, the transformer/quantizer 204 of the present invention uses the Hadamard transform. In the Hadamard transform, a Hadamard matrix composed of +1 and −1 is used to convert pixel values.

The first inverse quantizer/inverse transformer 206 receives the transformed/quantized spatially predicted pixel values from the transformer/quantizer 204, inversely quantizes/inversely transforms transformed and quantized coefficients of a one-dimensional conversion block, and outputs the inversely quantized/inversely transformed coefficients to the first RGB signal decoder 208.

The first RGB signal decoder 208 receives the inversely quantized/inversely transformed coefficients from the first inverse quantizer/inverse transformer 206, decodes an RGB signal of the one-dimensional conversion block, and outputs the decoded RGB signal to the first spatial prediction compensator 210.

The first spatial prediction compensator 210 receives the decoded RGB signal from the first RGB signal decoder 208, compensates for the spatially predicted pixel values of the one-dimensional conversion block, and outputs the compensated spatially predicted pixel values of the one-dimensional conversion block to the spatial predictor 200.

The mode determiner 212 determines a division mode for dividing the one-dimensional conversion block into a first region where at least one of the coefficients of the one-dimensional conversion block is not "0" and a second region where all of the coefficients are "0." The mode determiner 212 outputs the result of determination to the bit depth determination controller 214.

The division mode is for dividing the one-dimensional conversion block into a region where the coefficients of the one-dimensional conversion block are "0" and a region where the coefficients of the one-dimensional conversion block are not "0."

Figure 7:
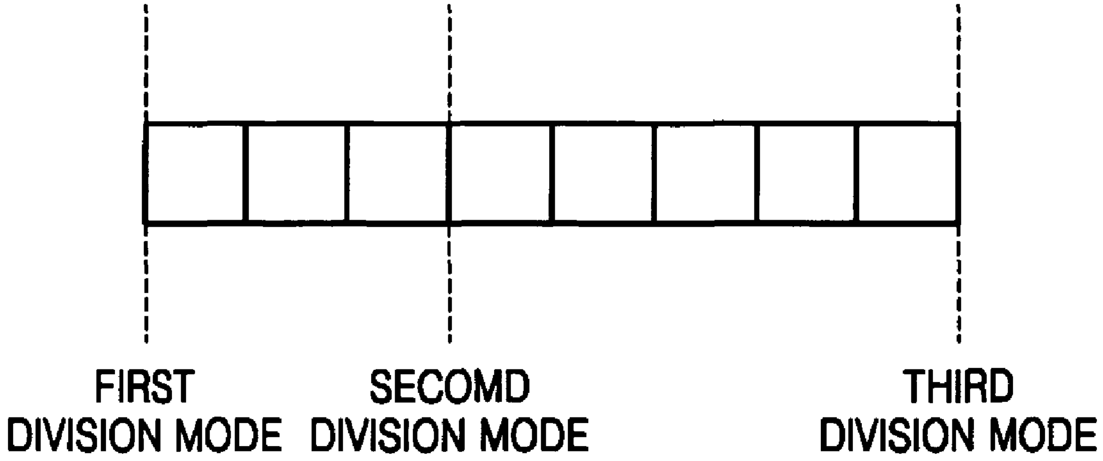
FIG. 7 illustrates three types of division mode dividing an 8×1 one-dimensional conversion block.

FIG. 7 illustrates three types of division mode dividing an 8×1 one-dimensional conversion block. Referring to FIG. 7, first through third division modes in the 8×1 one-dimensional conversion block are indicated by dotted lines. Positions of the first through third division modes indicated by the dotted lines in FIG. 7 are just examples and may be changed.

Figure 8A:
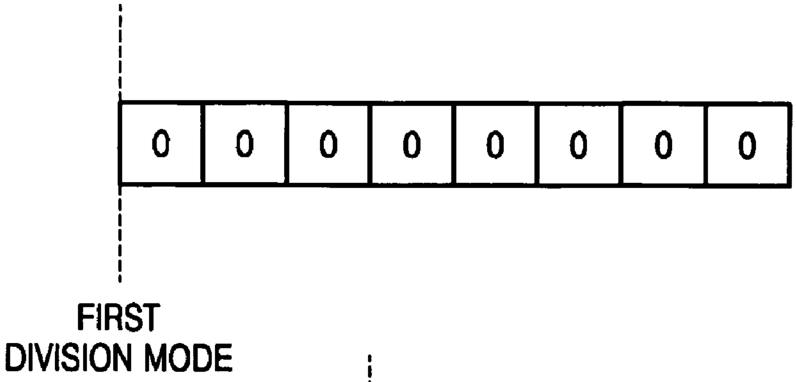
FIGS. 8A through 8D illustrate examples of the first through third division modes of FIG. 7 determined according to coefficients.

FIGS. 8A through 8D illustrate examples of the first through third division modes of FIG. 7 determined according to coefficients. Referring to FIG. 8A, the position of the dotted line of the first division mode is at the far left of a one-dimensional conversion block. Such a mode is generally called a skip mode. In this mode, the first region where at least one of the coefficients is not "0" does not exist, and only the second region where all of the coefficients are "0" exists. Therefore, if all of the coefficients of the one-dimensional conversion block are "0," the type of division mode is determined as the first division mode.

Figure 8B:
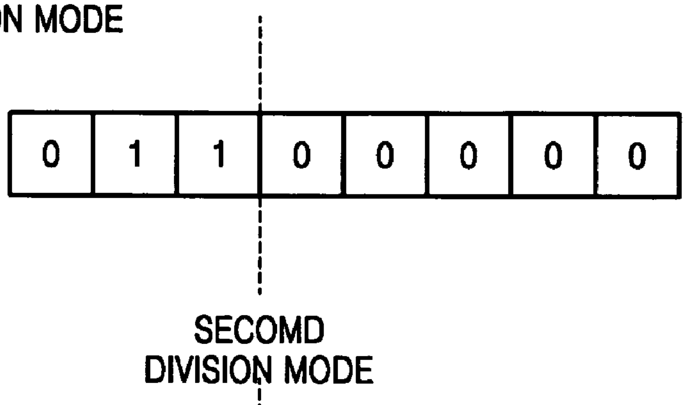

Referring to FIG. 8B, the position of the dotted line of the second division mode is between third and fourth coefficients of a one-dimensional conversion block. In this mode, the first region where at least one of the coefficients is not "0" exists and the second region where all of the coefficients are "0" also exists. Therefore, if all of the coefficients on the right of the second division mode indicated by the dotted line in the one-dimensional conversion block are "0," the type of division mode is determined as the second division mode.

Figure 8C:
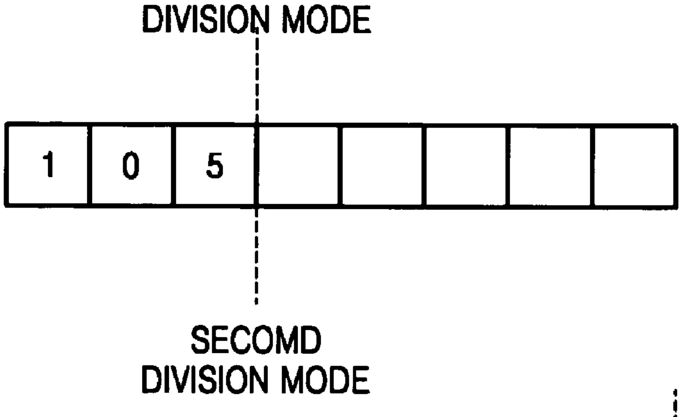
Figure 8D:
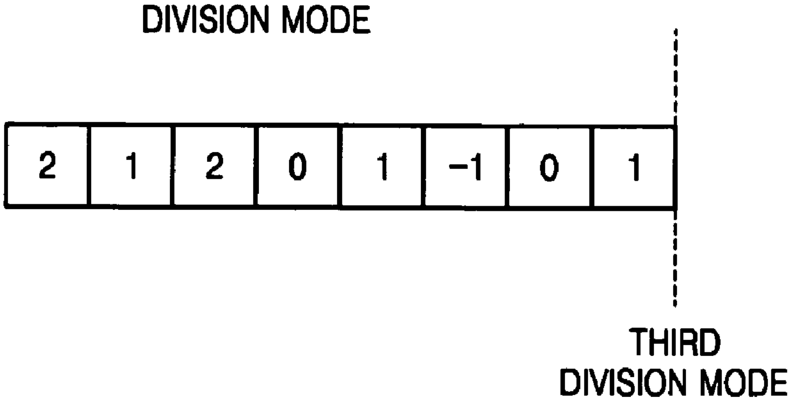

FIG. 8C illustrates another example of the second division mode. Referring to FIG. 8D, the position of the dotted line of the third division mode is at the far right of a one-dimensional conversion block. In this mode, the first region where at least one of the coefficients is not "0" exists and the second region where all of the coefficients are "0" does not exist. Therefore, if all of the coefficients on the right of the dotted line of the third division mode in the one-dimensional conversion block are "0," the type of division mode is determined as the third division mode.

Returning to FIG. 3, for example, the mode determiner 212 determines one of the first through third division modes of FIG. 7 as the division mode.

The bit depth determination controller 214 receives a division mode determined by the mode determiner 212 and determines a second bit depth indicating the number of bits used to binarize coefficients of the first region, based on whether all of the coefficients of the first region are within a predetermined range. Then, the bit depth determination controller 214 outputs the determined second bit depth to the bit depth resetter 216.

A bit depth refers to the number of bits used to store information regarding each pixel in computer graphics. Thus, the second bit depth denotes the number of bits used to binarize coefficients of the first region. A range of coefficients is pre-determined.

Table 1 below is a lookup table that shows the second bit depth determined according to a range of coefficients.

TABLE 1

| Division Mode Identification Information | Predetermined Range of Coefficients of First Region | Second Bit Depth |
|---|---|---|
| 1 | −4 through 3 | 3 |
| 2 | −8 through 7 | 4 |

If it is assumed that the division mode identification information in Table 1 indicates identification information of each of the second and third division modes in an 8×1 one-dimensional conversion block, the identification information of the second division mode is "1" and the identification information of the third division mode is "2." The first division mode, i.e., the skip mode, is not shown in Table 1 since the bit stream generator 218, which will be described later, does not generate bit streams for coefficients.

The bit depth determination controller 214 stores information needed to determine the second bit depth in a memory. The information may be a lookup table like Table 1.

Figure 9:
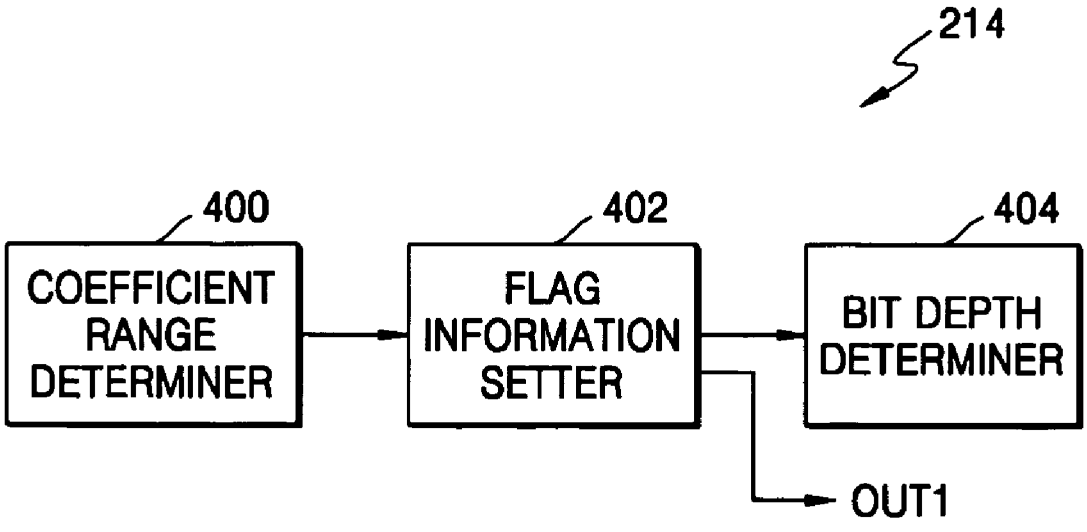
FIG. 9 is a detailed block diagram of a bit depth determination controller of FIG. 3 according to an embodiment of the present invention.

FIG. 9 is a detailed block diagram of the bit depth determination controller 214 of FIG. 3 according to an embodiment of the present invention. The bit depth determination controller 214 includes a coefficient range determiner 400, a flag information setter 402, and a bit depth determiner 404.

The coefficient range determiner 400 determines whether all of coefficients of the first region are within a predetermined range and outputs the result of determination to the flag information setter 402. For example, it is assumed that a predetermined range of coefficients of the first region is "−4 through 3" as shown in Table 1 and that a division mode determined by the mode determiner 212 is the second division mode (here, it is assumed that the identification information of the second division mode is "1"). The coefficient range determiner 400 determines whether the coefficients of the first region of the second division mode are within the predetermined range of "−4 through 3."

The flag information setter 402 sets first flag information indicating that all of the coefficients of the first region are within the predetermined range, in response to the result of determination made by the coefficient range determiner 400 and outputs the first flag information to the bit depth determiner 404.

FIG. 8B illustrates an example of the second division mode. Referring to FIG. 8B, all of the coefficients of the first region based on the position of the dotted line of the second division mode corresponding to a low-frequency signal are within the range of "−4 through 3." The first flag information indicates that all of the coefficients of the first region are within the range of "−4 through 3." Since the first flag information can be expressed as a binarized bit stream using any one of "0" or "1." 1 bit is assigned to binarize the first flag information.

The flag information setter 402 sets second flag information indicating that at least one of the coefficients of the first region is not within a predetermined range and outputs the second flag information to the bit depth resetter 216 via an output node OUT1. For example, it is assumed that the predetermined range of the coefficients of the first region is "−4 through 3" as shown in Table 1 and that a division mode determined by the mode determiner 212 is the second division mode (here, it is assumed that the identification information of the second division mode is "1").

Referring to FIG. 8C, not all of the coefficients of the first region based on the position of the dotted line of the second division mode, which correspond to a low-frequency signal, are within the range of "−4 through 3." In other words, since the third coefficient among the coefficients of the first region is "5," the third coefficient is not within the range of "−4 through 3." The second flag information indicates that not all of the coefficients of the first region are within the range of "−4 through 3." Since the second flag information can be expressed as a binarized bit stream using any one of "0" or "1," 1 bit is assigned to binarize the second flag information. If the first flag information is expressed as a bit stream of "1," the second flag information is expressed as a bit stream of "0."

Referring to FIGS. 3 and 9, the bit depth determiner 404 determines the second bit depth in response to the first flag information set by the flag information setter 402 and outputs the determined second bit depth to the bit depth resetter 216.

The bit depth determiner 404 also determines the second bit depth according to the type of division mode determined by the mode determiner 212. For example, if the first flag information is set, the bit depth determiner 404 determines "3 bits," which correspond to the second division mode whose identification mode is "1" (see Table 1), as the second bit depth. The bit depth determiner 404 may also determine a specific bit depth as the second bit depth regardless of the type of division mode.

The bit depth resetter 216 identifies a need for adjusting a compression rate of the one-dimensional conversion block, in response to the second bit depth determined by the bit depth determination controller 214. If the bit depth resetter 216 identifies the need for adjusting the compression rate of the one-dimensional conversion block, the bit depth resetter 216 resets first bit depth and outputs the reset first bit depth to the converter/quantizer 204. The first bit depth denotes the number of bits used to binarize coefficients of a one-dimensional conversion block. The bit depth resetter 216 resets the first bit depth using a quantization adjustment value for adjusting a quantization interval.

The transformer/quantizer 204 transforms and quantizes pixel values of the one-dimensional conversion block in response to the first bit depth reset by the bit depth resetter 216. If the bit depth resetter 216 does not identify the need for adjusting the compression rate, the bit depth resetter 216 outputs the determined division mode and second bit depth to the bit stream generator 218.

Table 2 below shows first bit depths corresponding to quantization adjustment values.

TABLE 2

| First Bit Depth [1 Bit] | Quantization Adjustment Value |
|---|---|
| 12 | 0 |
| 11 | 6 |
| 10 | 12 |
| 9 | 18 |
| 8 | 24 |
| 7 | 30 |
| 6 | 36 |

As shown in Table 2, the greater the quantization value, the smaller the first bit depth. A small first bit depth denotes that a small number of bits are used to binarize coefficients of a one-dimensional conversion block. Since a small number of bits are used to express the coefficients when the first bit depth is small, a small first bit depth is translated into a high compression rate.

Hence, if the quantization adjustment value is raised, thereby making the first bit depth smaller, the compression rate can be raised. However, image quality may be degraded due to the raised compression rate. Conversely, if the quantization adjustment value is lowered, thereby making the first bit depth larger, the compression rate can be lowered.

The bit stream generator 218 generates bit streams for coefficients of the first region according to the determined division mode and second bit depth. For example, if a predetermined range of coefficients of the first region is "−4 through 3" as shown in Table 1 and a division mode determined by the mode determiner 212 is the second division mode, the second bit depth is determined as "3 bits" as shown in Table 1.

FIG. 8B is an example of the second division mode. If bit streams of coefficients of the first region are generated according to the second bit depth, a bit stream of coefficient "00" according to the second bit depth is "000" and bit streams of two coefficients "1" according to the second bit depth are "001," respectively.

If all of the coefficients of the one-dimensional conversion block are "0," the bit stream generator 218 generates a bit stream only for identification information of a division mode. For example, referring to FIG. 8A, when the type of division mode is the first division mode, all of coefficients of the one-dimensional conversion block are "0." In the case of the first division mode in which all of the coefficients of the one-dimensional conversion block are "0," the bit stream generator 218 generates a bit stream only for "0" corresponding to the identification information of the first division mode and does not generate bit streams for converted/quantized coefficients.

When the type of mode is divided into three modes, each mode can be expressed using 2 bits. Therefore, a bit stream for "0," which is the identification information of the first division mode, is "00."

Also, if the number of bits required to generate bit streams for coefficients of the first region is greater than or equal to the number of bits required to generate bit streams for pixel values of a one-dimensional block, the bit stream generator 218 generates the bit streams for the pixel values of the one-dimensional block. For example, when an 8×1 block before being transformed/quantized has pixel values having a bit depth of 8 bits, if bit streams for the pixel values of the 8×1 block are generated without compressing the pixel values, the total number of bits is "8×8=64 bits." Therefore, when the total number of bits of the coefficients of the first region, which will be generated according to the first bit depth or the second bit depth, is 64 bits or greater, the bit stream generator 218 does not generate bit streams for transformed/quantized coefficients and generates bit streams for the pixel values of the one-dimensional block before being transformed/quantized.

The bit stream generator 218 may generate bit streams for coefficients of the first region according to the determined division mode and predetermined first bit depth. For example, it is assumed that the predetermined range of the coefficients of the first region is "−4 through 3" as shown in Table 1 and that a division mode determined by the mode determiner 212 is the second division mode.

FIG. 8C is another example of the second division mode. Referring to FIG. 8C, it can be seen that second flag information indicating that not all of the coefficients of the first region are within the predetermined range of "−4 through 3" is set by the flag information setter 402. If the second flag information is set by the flag information setter 402 and the second bit depth is not determined, the bit stream generator 218 generates bit streams for the coefficients of the first region according to the predetermined first bit depth (for example, 9 bits).

The bit stream generator 218 may generate bit streams for the coefficients of the one-dimensional conversion block using a variable length coding method. In the variable length coding method, short bit streams are generated for coefficients that occur in high probability and long bit streams are generated for coefficients that occur in low probability.

In particular, when generating bit streams for the coefficients of the first region, the bit stream generator 218 divides the coefficients of the first region into a first coefficient and the remaining coefficients and generates bit streams using the variable length coding method.

For example, when the first coefficient of the first region is "0" as shown in FIG. 8B, the bit stream generator 218 encodes the first coefficient into "0." Also, when an absolute value of the first coefficient of the first region is "1," the bit stream generator 218 encodes the first coefficient into "10." However, if the absolute value of the first coefficient of the first region is "0" nor "1," the bit stream generator 218 encodes the first coefficient into "11," generates a bit stream for the first coefficient according to the determined division mode and the first or second bit depth, and add the bit stream behind "11."

Also, when absolute values of the coefficients excluding the first coefficient of the first region are "1," the bit stream generator 218 encodes the coefficients into "0." When the absolute values of the coefficients excluding the first coefficient of the first region are "0," the bit stream generator 218 encodes the coefficients into "10." However, if the absolute values of the coefficients excluding the first coefficient of the first region are "0" nor "1," the bit stream generator 218 encodes the coefficients into "11," generates bit streams for the coefficients excluding the first coefficient of the first region according to the determined division mode and the first or second bit depth, and add the bit stream behind "11."

The bit stream generator 218 encodes "+ (positive sign)" into "0" and encodes "− (negative sign)" into "1" in order to encode "+ (positive sign" and − (negative sign)" of coefficients of the first region, and adds "0" and "1" to the encoded bit streams of the coefficients.

The bit stream generator 218 may generate bit streams for identification information of a prediction direction mode using the variable length coding method. For example, if each spatial prediction direction is defined as a prediction direction mode, the bit stream generator 218 may encode a vertical prediction direction mode into "0", a right diagonal prediction direction mode into "10," and a left diagonal prediction direction mode into "11."

Generating bit streams for coefficients of the first region or prediction direction modes using the variable length coding method described above is just an example. Bit streams for the coefficients of the first region may be generated using diverse methods.

Returning to FIG. 1, the first buffer 102 temporarily stores bit streams generated by the one-dimensional block-encoding unit 100. When the bit streams are accumulated to produce a bit stream of a predetermined size, the first buffer 102 outputs the bit stream of the predetermined size to the memory 104. The first buffer 102 temporarily stores bit streams of various sizes input from the one-dimensional encoder 100. When the bit streams of various sizes are accumulated to produce a bit stream of a predetermined size, the first buffer 102 outputs the bit stream of the predetermined size to the memory 104. Due to the first buffer 102, bit streams of various sizes generated by the one-dimensional block encoder 100 are transformed into a bit stream of a predetermined size and the bit stream of the predetermined size is transmitted to the memory 104.

The memory 104 stores the bit stream of the predetermined size received from the first buffer 102. In particular, since the memory 104 of the present invention compresses image data before storing the image data, a large memory capacity is not required. In other words, in the present invention, it is not necessary to separately implement a writing memory for storing pixel values of a previous frame and a reading memory for comparing pixel values of a current frame with the stored pixel values of the previous frame. Hence, the memory 104 used in the present invention may include only one synchronous dynamic random access memory (SDRAM).

The second buffer 106 receives and temporarily stores the bit stream of the predetermined size stored in the memory 104 and outputs the temporarily stored bit stream of the predetermined size to the one-dimensional block decoder 108 in one-dimensional block units. The second buffer 106 divides the bit stream of the predetermined size stored in the memory 104 in one-dimensional block units and transmits the divided bit stream to the one-dimensional block-decoding unit 108.

The one-dimensional block-decoding unit 108 decodes a bit stream for pixel values of a previous frame $F'_{n-1}$ received from the second buffer 106 in one-dimensional block units by inversely quantizing/inversely transforming the bit stream for the pixel values of the previous frame $F'_{n-1}$ and outputs the decoded bit stream to the compensation pixel value-detecting unit 110.

Figure 10:
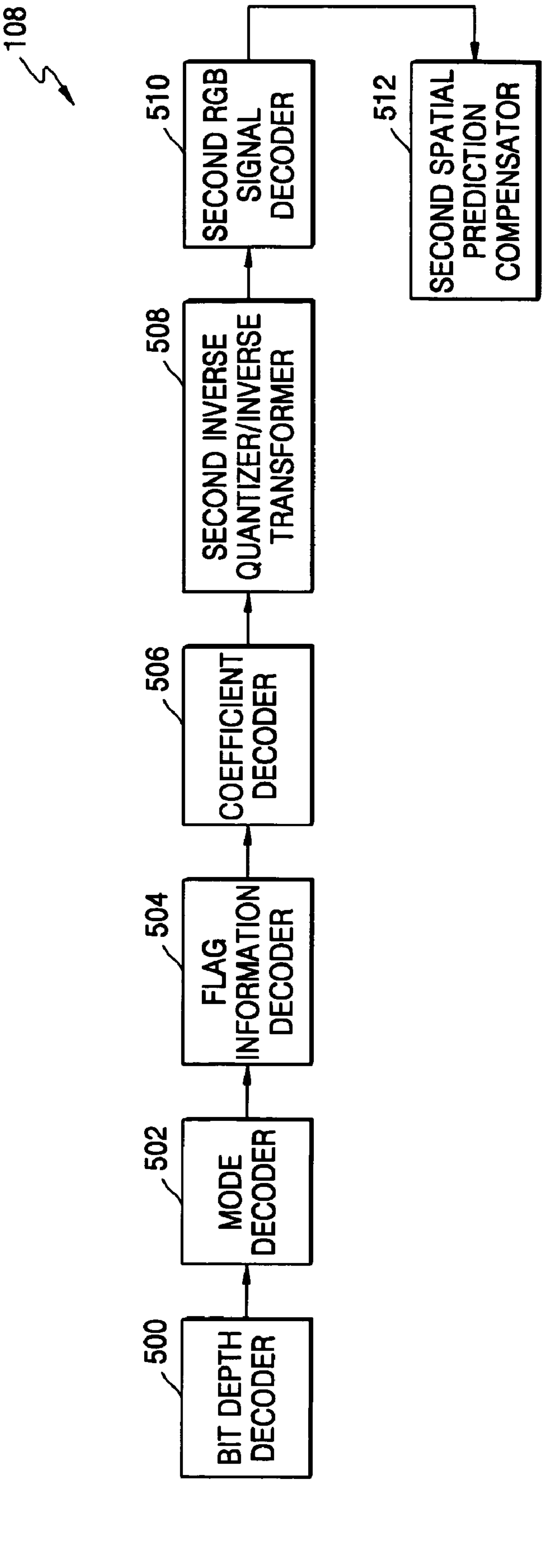
FIG. 10 is a detailed block diagram of a one-dimensional block-decoding unit of FIG. 1 according to an embodiment of the present invention.

FIG. 10 is a detailed block diagram of the one-dimensional block-decoding unit 108 of FIG. 1 according to an embodiment of the present invention. The one-dimensional block-decoding unit 108 includes a bit depth decoder 500, a mode decoder 502, a flag information decoder 504, a coefficient decoder 506, a second inverse quantizer/inverse transformer 508, a second RGB signal decoder 510, a second spatial prediction compensator 512.

The bit depth decoder 500 decodes information of the first bit depth indicating the number of bits used to binarize coefficients of a one-dimensional conversion block and outputs the decoded information to the mode decoder 502. For example, if the first bit depth predetermined or reset in the encoding process has information indicating "9 bits," the bit depth decoder 500 decodes the information indicating that the first bit depth is "9 bits."

In response to the decoded information of the first bit depth received from the bit depth decoder 500, the mode decoder 502 decodes information regarding a bit stream for a division mode dividing the one-dimensional conversion block into the first region where at least one of coefficients of the one-dimensional conversion block is not "0" and the second region where all of the coefficients are "0," and outputs the decoded information to the flag information decoder 504. For example, if a bit stream for a division mode generated in the encoding process are a bit stream for the second division mode of FIG. 8B, the mode decoder 502 decodes "01" corresponding to the bit stream for the second division mode.

After receiving the decoded information of the division mode from the mode decoder 502, the flag information decoder 504 decodes the bit stream for the first flag information indicating that all of coefficients of the first region are within a predetermined range or a bit stream for the second flag information indicating that at least one of the coefficients of the first region is not within the predetermined range and outputs the decoded bit stream to the coefficient decoder 506.

For example, in the second division mode of FIG. 8B, all of the coefficients of the first region are within the predetermined range of "−4 through 3" shown in Table 1. Thus, the bit streams of the first flag information are generated for the second division mode in the encoding process. Accordingly, the flag information decoder 504 decodes the first flag information for the second division mode.

Also, in the second division mode of FIG. 8C, at least one of the coefficients of the first region is not within the predetermined range of "−4 through 3" as shown in Table 1. Thus, bit streams of the second flag information for the second division mode are generated in the encoding process. Accordingly, the flag information decoder 504 decodes the second flag information for the second division mode.

The coefficient decoder 506 receives the decoded first or second flag information from the flag information decoder 504, decodes information of the bit streams for the coefficients of the one-dimensional conversion block, and outputs the decoded information to the second inverse quantizer/inverse transformer 508. For example, the coefficient decoder 506 sequentially decodes "000," "001," and "001," which are bit streams for the coefficients of the first region of FIG. 8B, respectively. In particular, if bit streams for the coefficients of the one-dimensional conversion block are generated using the variable length coding method, the coefficient decoder 506 decodes the coefficients of the one-dimensional conversion block in a reverse process of the variable length coding method.

The second inverse quantizer/inverse transformer 508 inversely quantizes and inversely transforms the coefficients of the one-dimensional conversion block received from the coefficient decoder 506 and outputs the inversely quantized/inversely transformed coefficients of the one-dimensional conversion block to the second RGB signal decoder 510. The inverse quantization/inverse transform of the coefficients of the one-dimensional conversion block is performed as a reverse process of the transform/quantization process. In particular, the second inverse quantizer/inverse transformer 508 inversely transforms the transformed coefficients of the one-dimensional conversion block using the Hadamard transform method.

The second RGB signal decoder 510 receives the inversely quantized/inversely transformed coefficients from the second inverse quantizer/inverse transformer 508, decodes an RGB signal of the inversely quantized/inversely transformed block, and outputs the RGB signal to the second spatial prediction compensator 512.

The second spatial prediction compensator 512 receives the decoded RGB signal from the second RGB signal decoder 510 and compensates for the spatially predicted pixel values of the inversely quantized/inversely transformed block having the decoded RGB signal. In particular, the second spatial prediction compensator 512 compensates for the spatially predicted pixel values of the one-dimensional block using only the pixel values of the blocks in the row above the row where the one-dimensional block is.

The compensation pixel value-detecting unit 110 detects a compensation pixel value for each pixel, based on a difference between a value of a pixel of the current frame $F_n$ and a value of a pixel of the previous frame $F'_{n-1}$ decoded by the one-dimensional block-decoding unit 108. For example, if a pixel value of the current frame $F_n$ is "128" and a pixel value of the previous frame $F'_{n-1}$ is "118," the compensation pixel value-detecting unit 110 detects a compensation pixel value "128+50=178," which is obtained by adding a compensation value (for example, 50) corresponding to the difference between the two pixel values, i.e., "10," to the pixel value of the current frame $F_n$. The compensation pixel value-detecting unit 110 stores compensation values respectively corresponding to the differences between pixel values of the current frame $F_n$ and the pixel values of the previous frame $F'_{n-1}$ in a lookup table.

A DCC method for an LCD according to the present invention will now be described with reference to the attached drawings.

Figure 11:
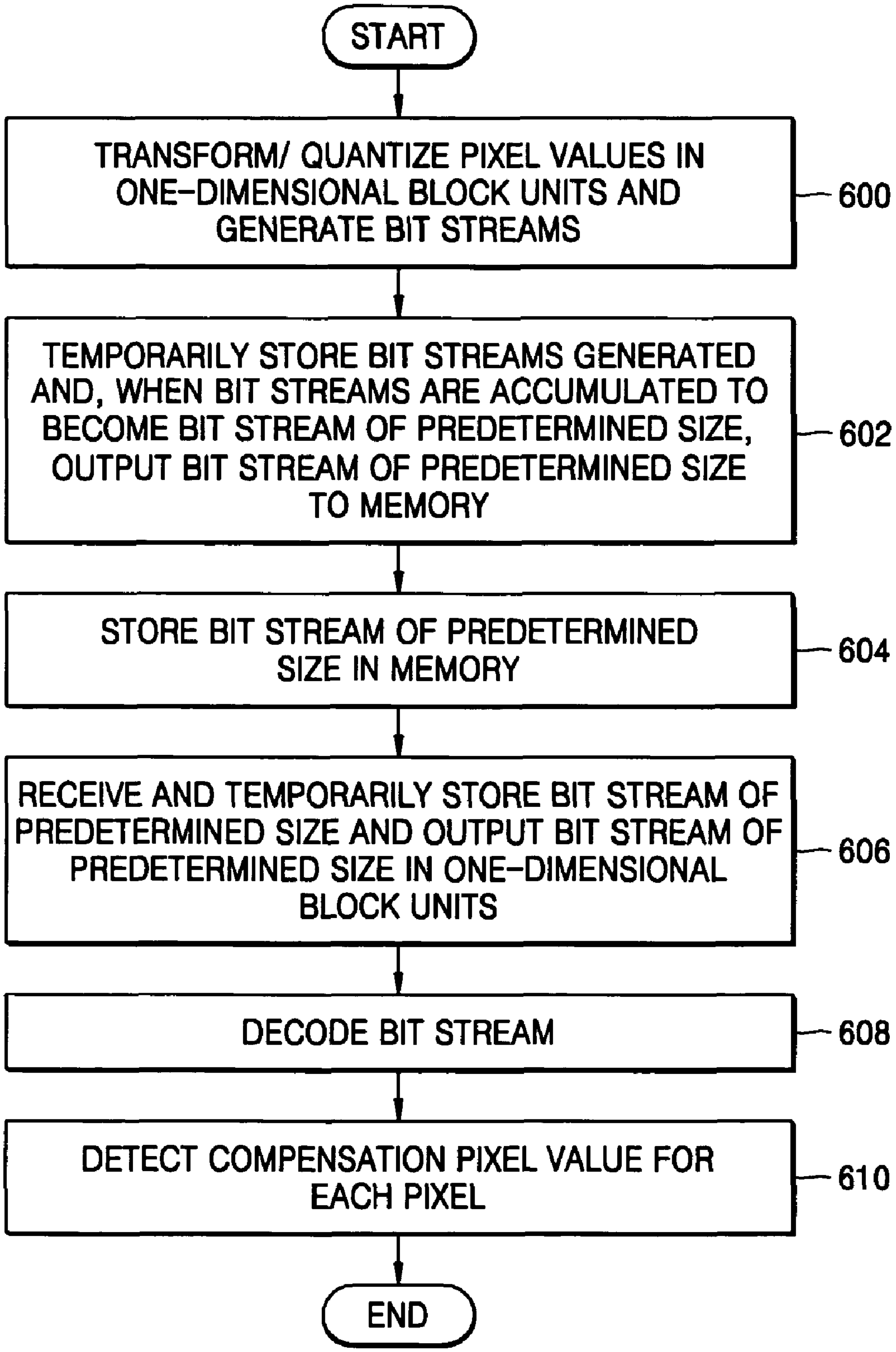
FIG. 11 is a flowchart illustrating a DCC method for an LCD according to an embodiment of the present invention.

FIG. 11 is a flowchart illustrating a DCC method for an LCD according to an embodiment of the present invention. Referring to FIG. 11, pixel values of an image read in line units are divided in predetermined pixel units into one-dimensional blocks. The one-dimensional blocks are transformed/quantized and a bit stream is generated (operation 600). FIGS. 2A and 2B illustrate examples of one-dimensional blocks as described above.

Figure 12:
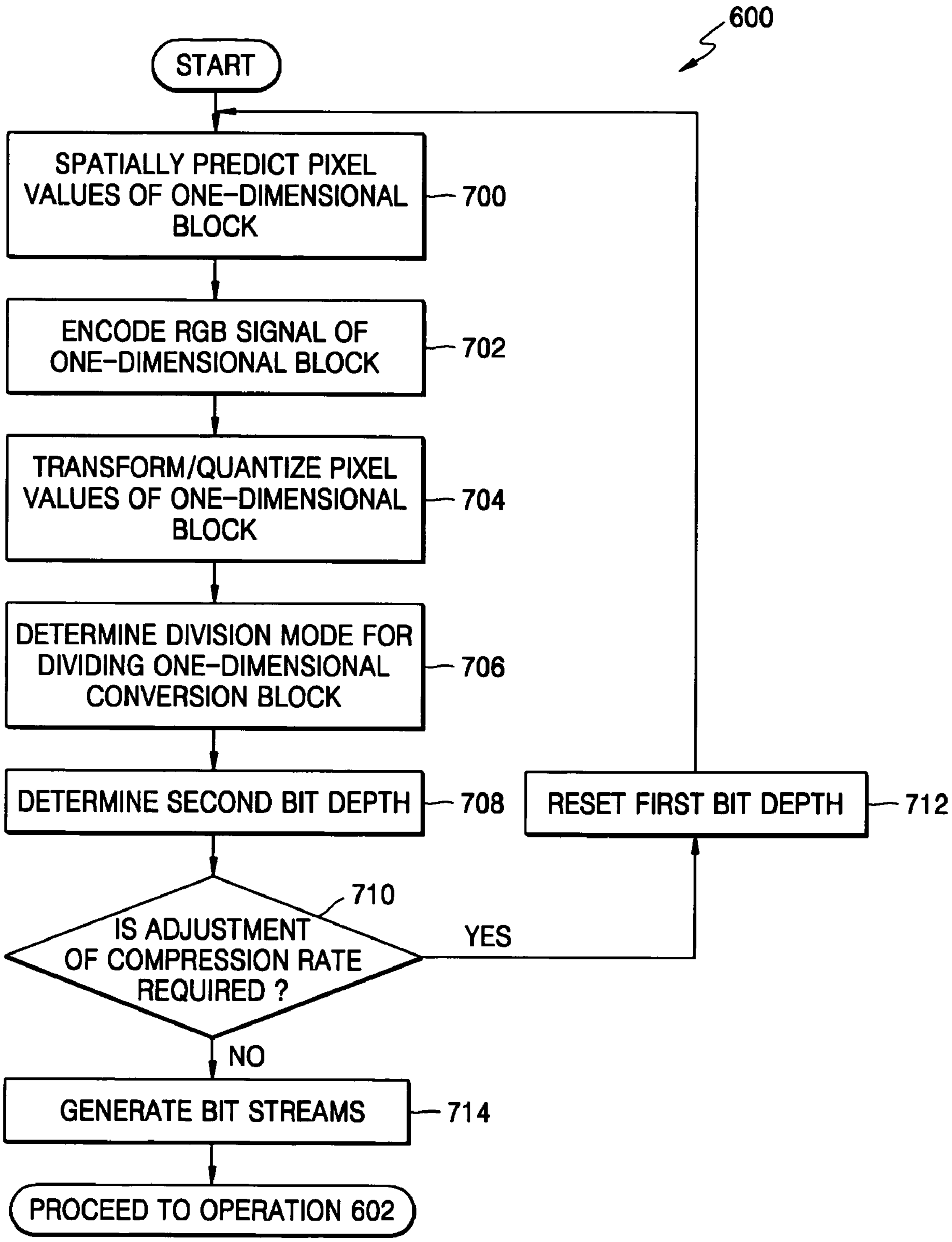
FIG. 12 is a flowchart illustrating operation 600 of FIG. 11 according to an embodiment of the present invention.

FIG. 12 is a flowchart illustrating operation 600 of FIG. 11 according to an embodiment of the present invention. Pixel values of a one-dimensional block are spatially predicted using blocks adjacent to the one-dimensional block (operation 700). In other words, spatially predicted pixel values are obtained by estimating a prediction direction based on blocks adjacent to the one-dimensional block for each R, G and B color component. In particular, the one-dimensional block is spatially predicted using only pixel values of blocks in a row above a row where the one-dimensional block is.

Figure 13:
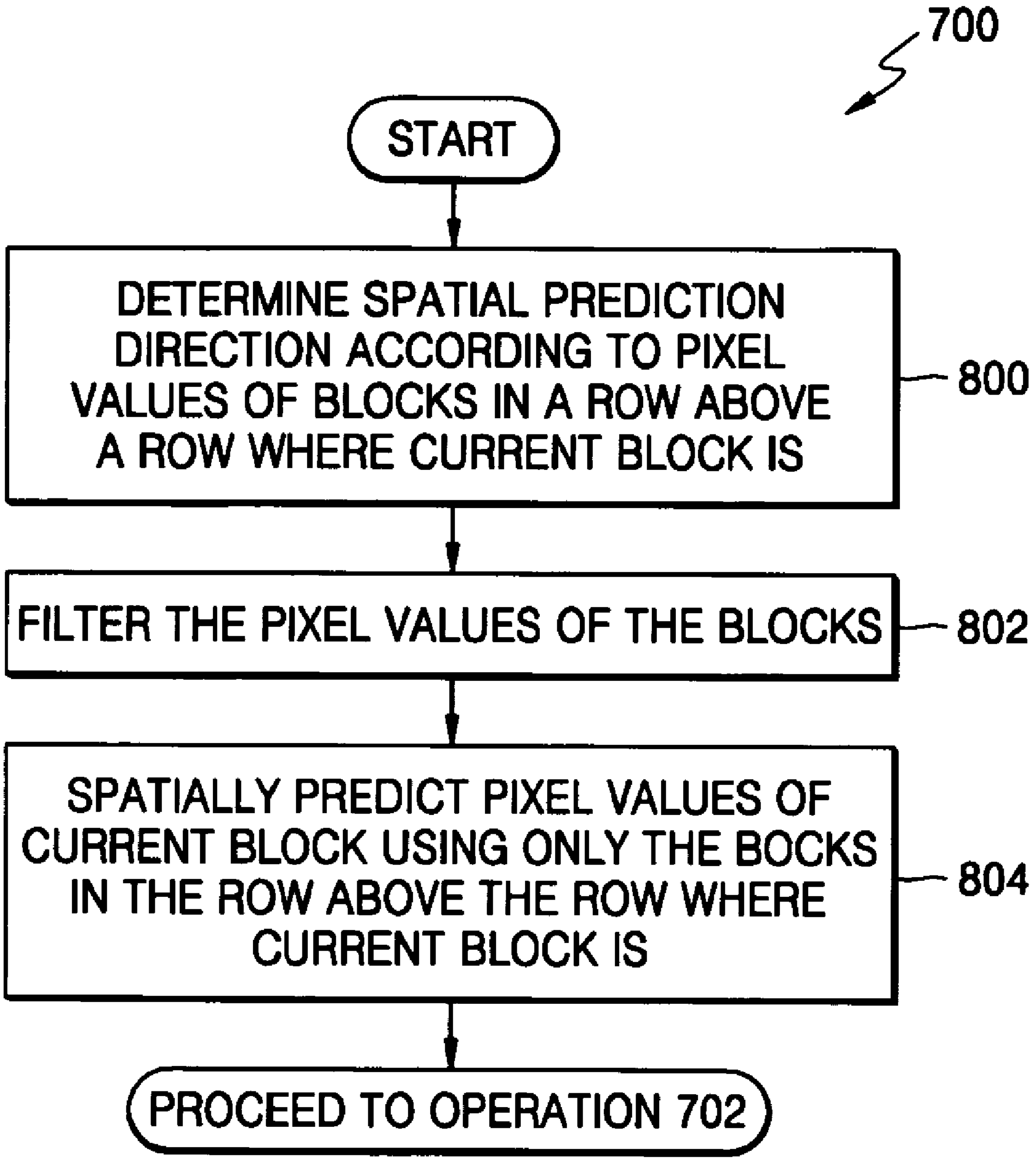
FIG. 13 is a flowchart illustrating operation 700 of FIG. 12 according to an embodiment of the present invention.

FIG. 13 is a flowchart illustrating operation 700 of FIG. 12 according to an embodiment of the present invention. Referring to FIG. 13, a spatial prediction direction is determined using pixel values of blocks in a row above a row where a one-dimensional block is (operation 800). FIGS. 5A through 5C illustrate examples of prediction directions of an 8×1 block, which corresponds to a one-dimensional block, as described above. Also, FIG. 6 illustrates an example of pixel values of a 4×1 one-dimensional block and pixel values of blocks in a row above a row where the 4×1 one-dimensional block is. A spatial prediction direction may be a vertical direction, a right diagonal direction, or a left diagonal direction.

In particular, sums of differences between pixel values of a one-dimensional block and pixel values of blocks in a row above a row where the one-dimensional block is are calculated for the respective R, G and B components and a prediction direction having a minimum sum among sums of the sums of the differences for the R, G and B components is determined as a spatial prediction direction. Since the methods of determining the spatial prediction direction have been described above, their detailed descriptions will be omitted.

After operation 800, the pixel values of the blocks in the row above the row where the one-dimensional block is are filtered (operation 802). Such filtering is required to prevent degradation of image quality caused by the spatial prediction performed using only the pixel values of the blocks in the row above the row where the one-dimensional block is. The method of filtering pixel values of blocks in a row above a row where a one-dimensional block is has been described above, and thus its detailed description will be omitted.

After operation 802, the pixel values of the one-dimensional block are spatially predicted using only the pixel values of the blocks in the row above the row where the one-dimensional block is (operation 804). The pixel values of the one-dimensional block are spatially predicted in a direction determined in operation 800 as the spatial prediction direction among the vertical direction, the right diagonal direction, and the left diagonal direction. Since the methods of determining the spatial prediction direction have been described above, their detailed descriptions will be omitted.

After operation 700, redundant information is removed from the spatially predicted pixel values of the one-dimensional block for each of the R, G and B components, and an RGB signal having the redundant information removed is encoded (operation 702). When pixel values are spatially predicted for each of the R, G and B color components of an RGB image, redundant information is removed using the correlation between the spatially predicted pixel values for each of the R, G and B components, and an RGB signal without the redundant information is encoded.

After operation 702, pixel values of the one-dimensional block are transformed and quantized (operation 704). In particular, in the present embodiment, the Hadamard transform, which is one kind of orthogonal transform encoding, is used. In the Hadamard transform, a Hadamard matrix composed of +1 and −1 is used to transform pixel values.

After operation 704, a division mode for dividing a one-dimensional conversion block, i.e., the transformed/quantized one-dimensional block, into a first region where at least one of the coefficients of the one-dimensional conversion block is not “0” and a second region where all of the coefficients are “0” is determined (operation 706). The division mode is for dividing the one-dimensional conversion block into a region where the coefficients of the one-dimensional conversion block are “0” and a region where the coefficients of the one-dimensional conversion block are not “0.”

FIG. 7 illustrates three types of division mode dividing an 8×1 one-dimensional conversion block. FIGS. 8A through 8D illustrate examples of the first through third division modes of FIG. 7 determined according to coefficients. A method of determining a division mode has been described above, and thus it description will be omitted.

After operation 706, a second bit depth indicating the number of bits used to binarize coefficients of the first region is determined based on whether all of the coefficients of the first region are within a predetermined range (operation 708). The second bit depth denotes the number of bits used to binarize coefficients of the first region. Table 1 is a lookup table that shows the second bit depth determined according to a value range.

Figure 14:
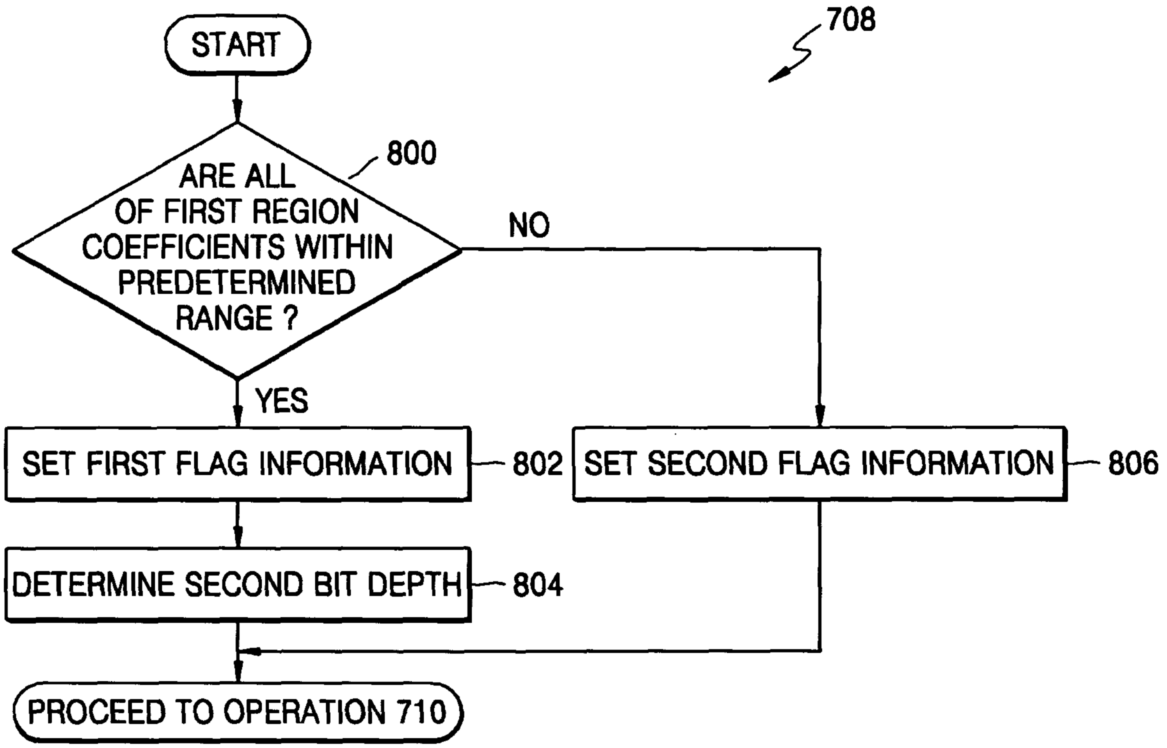
FIG. 14 is a flowchart illustrating operation 708 of FIG. 12 according to an embodiment of the present invention.

FIG. 14 is a flowchart illustrating operation 708 of FIG. 12 according to an embodiment of the present invention. Referring to FIG. 14, it is determined whether all of coefficients of the first region are within a predetermined range (operation 1000). If it is determined that all of the coefficients of the first region are within the predetermined range, first flag information indicating that all of the coefficients of the first region are within the predetermined range is set (operation 1002). Since a method of setting the first flag information has been described above, its detailed description will be described. After operation 1002, the depth of the second bit is determined (operation 1004).

In operation 1000, if it is determined that at least one of the coefficients of the first region is not within the predetermined range, second flag information indicating that at least one of the coefficients of the first region is not within the predetermined range is set (operation 1006). Since a method of setting the second flag information has been described above, its detailed description will be described.

Returning to FIG. 12, after operation 708, a need for adjusting a compression rate of the one-dimensional conversion block is identified (operation 710). If the need for adjusting the compression rate of the one-dimensional conversion block is identified, the first bit depth indicating the number of bits used to binarize coefficients of a one-dimensional conversion block is reset, and then operation 700 is performed (operation 712). The first bit depth denotes the number of bits used to binarize coefficients of a one-dimensional conversion block. The first bit depth is reset using a quantization adjustment value for adjusting a quantization interval. Table 2 shows first bit depths corresponding to quantization adjustment values.

However, if the need for adjusting the compression rate of the one-dimensional conversion block is not identified, bit streams for coefficients of the first region are generated according to the determined division mode and second bit depth (operation 714). If all of the coefficients of the one-dimensional conversion block are "0," bit streams are generated only for identification information of a division mode. In addition, if the number of bits required to generate bit streams for coefficients of the first region is greater than or equal to the number of bits required to generate bit streams for the pixel values of the one-dimensional block, the bit streams for the pixel values of the one-dimensional block are generated.

Since operation 708 is not necessarily required in the present embodiment, operation 708 may be omitted. If operation 708 is omitted, a bit stream for the coefficients of the first region is generated according to the determined division mode and first bit depth in operation 714. If operation 708 is not omitted, when the second flag information is set but the second bit depth is not set, a bit stream for the coefficients of the first region is also generated according to the determined division mode and first bit depth in operation 714.

Bit streams for the coefficients of the one-dimensional conversion block may be generated using a variable length coding method. In the variable length coding method, short bit streams are generated for coefficients that occur in high probability and long bit streams are generated for coefficients that occur in low probability.

In particular, when generating bit streams for coefficients of the first region, the coefficients of the first region are divided into a first coefficient and the remaining coefficients and then bit streams are generated using the variable length coding method.

Bit streams for identification information of a prediction direction mode can also be generated using the variable length coding method. Since the method of generating bit streams using the variable length coding method has been described above, its detailed description will be omitted.

Returning to FIG. 11, after operation 600, bit streams generated are temporarily stored and accumulated to produce a bit stream of a predetermined size and the bit stream of the predetermined size is output to the memory (operation 602). When bit streams of various sizes are accumulated to produce a bit stream of a predetermined size, the bit stream of the predetermined size is output to the memory.

After operation 602, the bit stream of the predetermined size is stored in the memory (operation 604). In particular, in the present invention, since image data is compressed before being stored, a large memory capacity is not required. In other words, in the present embodiment, it is not necessary to separately implement a writing memory for storing pixel values of a previous frame and a reading memory for comparing pixel values of a current frame with the stored pixel values of the previous frame. Hence, the memory used in the present embodiment may include only one SDRAM.

After operation 604, the bit stream of the predetermined size stored in the memory 104 is temporarily stored, and the bit stream of the predetermined size is output in one-dimensional block units (operation 606).

After operation 606, the bit stream received in one-dimensional block units is inversely quantized/inversely converted and decoded (operation 608).

Figure 15:
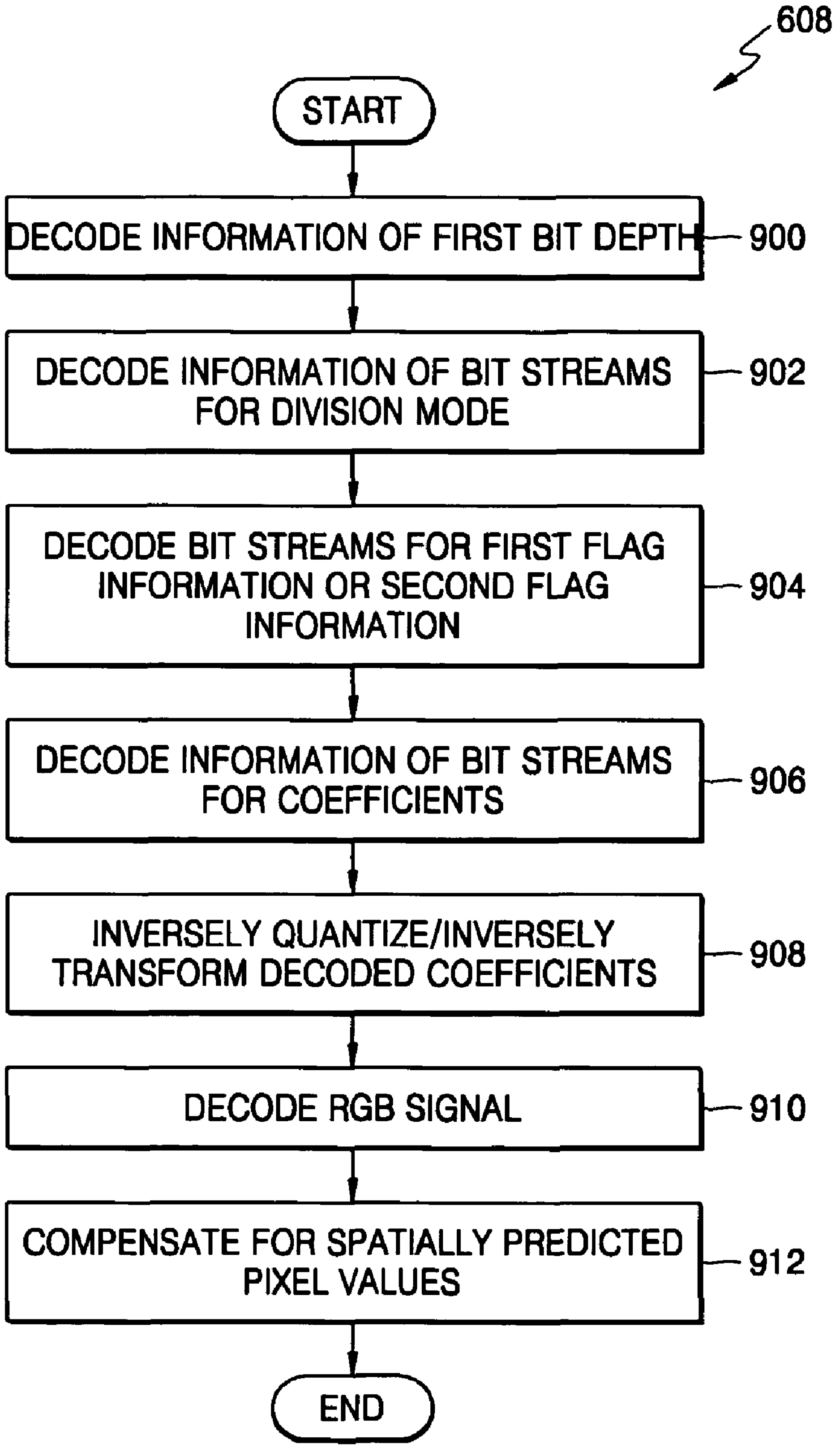
FIG. 15 is a flowchart illustrating operation 608 of FIG. 11 according to an embodiment of the present invention.

FIG. 15 is a flowchart illustrating operation 608 of FIG. 11 according to an embodiment of the present invention. When a one-dimensional block having pixel values transformed/quantized is defined as a one-dimensional conversion block, information of the first bit depth indicating the number of bits used to binarize coefficients of the one-dimensional conversion block is decoded (operation 900). For example, if the first bit depth predetermined or reset in the encoding process has information indicating "9 bits," the information indicating that the first bit depth is "9 bits" is decoded.

After operation 900, information of bit streams for the division mode dividing the one-dimensional conversion block into the first region where at least one of the coefficients of the one-dimensional conversion block is not "0" and the second region where all of the coefficients of the one-dimensional conversion block are "0" is decoded (operation 902).

After operation 902, bit streams for the first flag information indicating that all of coefficients of the first region are within a predetermined range or bit streams for the second flag information indicating that at least one of the coefficients of the first region is not within the predetermined range are decoded (operation 904).

After operation 904, information of the bit stream for the coefficients of the one-dimensional conversion block is decoded (operation 906). In particular, if the bit stream for the coefficients of the one-dimensional conversion block is generated using the variable length coding method, the coefficients of the one-dimensional conversion block are decoded as a reverse process of the variable length coding method.

After operation 906, the coefficients of the one-dimensional conversion block are inversely quantized/inversely transformed (operation 908 ). The inverse quantization/inverse transform of the coefficients of the one-dimensional conversion block is performed as a reverse process of the transform/quantization process. In particular, the converted coefficients of the one-dimensional conversion block are inversely transformed using the Hadamard transform method.

After operation 908, an RGB signal of the inversely quantized/inversely transformed block is decoded (operation 910).

After operation 910, spatially predicted pixel values of the inversely quantized/inversely transformed block having the decoded RGB signal are compensated for (operation 912). In particular, the spatially predicted pixel values of the one-dimensional block are compensated for using only pixel values of blocks in the row above the row where the one-dimensional block is.

Returning to FIG. 11, after operation 608, a compensation pixel value for each pixel is detected, based on a difference between a pixel value of a current frame and a pixel value of a decoded previous frame for each pixel (operation 610). A method of detecting a compensation pixel value for each pixel has been described above, and thus its description will be omitted.

In a DCC apparatus and method for an LCD according to the above-described embodiments of the present invention, when the DCC is performed, image data is encoded and decoded in line units. Thus, the image data can be processed in real time.

In addition, in the DCC apparatus and method for the LCD according to the above-described embodiments of the present invention, when performing the DCC to improve response time, which is one of disadvantages of an LCD, the number of memories for storing pixel values of image data used to perform the DCC can be reduced, thereby saving parts.

In the DCC apparatus and method for the LCD according to the above-described embodiments of the present invention, since the number of memories is reduced, the number of pins of memory interfaces can also be reduced, resulting in a decrease in a chip size.

Also, the DCC apparatus and method for the LCD according to the above-described embodiments of the present invention enhance compression efficiency while avoiding much visual degradation of image quality.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A dynamic capacitance compensation apparatus of a liquid crystal display, the apparatus comprising:

a one-dimensional block-encoding unit to read pixel values of an image in line units, divide the pixel values of the read image into one-dimensional blocks in predetermined pixel units, transform and quantize the one-dimensional blocks, and generate bit streams;

a computer readable memory to store the generated bit streams;

a one-dimensional block-decoding unit which decodes bit streams stored in the memory by inverse quantization and inverse transform; and a compensation pixel value-detecting unit to detect a compensation pixel value for each pixel based on a difference between each pixel value of a current frame and each pixel value of a previous frame decoded by the one-dimensional block-decoding unit.

2. The apparatus of claim 1, further comprising:

a first buffer to temporarily store the bit streams generated by the one-dimensional block-encoding unit and, when the bit streams are accumulated to become a bit stream of a predetermined size, to output the bit stream of the predetermined size to the memory; and a second buffer to receive and temporarily to store the bit stream of the predetermined size stored in the memory and to output the temporarily stored bit stream of the predetermined size to the one-dimensional block-decoding unit in one-dimensional block units.

3. The apparatus of any one of claim 1, wherein the one-dimensional block-encoding unit comprises:

a transformer and quantizer to transform and quantize pixel values of each one-dimensional block; and a bit stream generator to generate bit streams for a one-dimensional conversion block when a transformed and quantized one-dimensional block is defined as the one-dimensional conversion block.

4. The apparatus of claim 3, wherein the transformer and quantizer transforms the pixel values of each one-dimensional block using a Hadamard transform method.

5. The apparatus of claim 3, wherein the one-dimensional block-encoding unit comprises:

a spatial predictor to spatially predict pixel values of a one-dimensional block using blocks spatially adjacent to the one-dimensional block;

a first inverse quantizer and inverse transformer to inversely quantize and inversely transform the one-dimensional conversion block; and a first spatial prediction compensator to compensate for spatially predicted pixel values of the one-dimensional conversion block.

6. The apparatus of claim 5, wherein the spatial predictor comprises:

a prediction direction determiner to determine a spatial prediction direction using pixel values of blocks in a row above a row where the one-dimensional block is, among the blocks spatially adjacent to the one-dimensional block;

a pixel value filter to filter the pixel values of the blocks in the row above the row where the one-dimensional block is, which are used to spatially predict the one-dimensional block; and a pixel value predictor to spatially predict the pixel values of the one-dimensional block using only the blocks in the row above the row where the one-dimensional block is.

7. The apparatus of claim 6, wherein the prediction direction determiner calculates a sum of differences between the pixel values of the one-dimensional block and the pixel values of the blocks in the row above the row where the one-dimensional block is, for each of R, G and B components and determines a prediction direction having a minimum sum among sums of the sums of the differences for the RGB components as the spatial prediction direction.

8. The apparatus of claim 6, wherein, when each spatial prediction direction is identified as a prediction direction mode, the bit stream generator generates bit streams for identification information of the prediction direction mode using a variable length coding method.

9. The apparatus of claim 3, wherein the one-dimensional block-encoding unit further comprises:

an RGB signal encoder to remove redundant information from R, G and B pixel values and encoding an RGB signal without the redundant information;

a first inverse quantizer and inverse transformer to inversely quantize and to inversely transform the one-dimensional conversion block; and a first RGB signal decoder to decode the encoded RGB signal of the one-dimensional conversion block.

10. The apparatus of claim 3, wherein the one-dimensional block-encoding unit further comprises a mode determiner to determine a division mode for dividing the one-dimensional conversion block into a first region where at least one of coefficients of the one-dimensional conversion block is not "0" and a second region where all of the coefficients of the one-dimensional conversion block are "0," and wherein the bit stream generator generates bit streams for first region coefficients corresponding to coefficients of the first region according to the determined division mode.

11. The apparatus of claim 10, wherein the bit stream generator generates bit streams only for identification information of the division mode when all of the coefficients of the one-dimensional conversion block are "0."

12. The apparatus of claim 10, wherein the bit stream generator generates bit streams for the pixel values of the one-dimensional block when a total number of bits used to generate bit streams for the first region coefficients is at least equal to a total number of bits used to generate the bit streams for the pixel values of the one-dimensional block.

13. The apparatus of claim 10, wherein the bit stream generator generates bit streams for the coefficients of the one-dimensional conversion block using a variable length coding method.

14. The apparatus of claim 13, wherein the bit stream generator divides the first region coefficients into a first coefficient and coefficients excluding the first coefficient and then generates bit streams for the first region coefficients using the variable length coding method.

15. The apparatus of claim 3, wherein the one-dimensional block-encoding unit further comprises a bit depth determination controller to determine a second bit depth indicating a number of bits used to binarize the first region coefficients according to whether all of the first region coefficients are within a predetermined range.

16. The apparatus of claim 15, wherein the bit depth determination controller comprises:
- a coefficient range determiner to determine whether all of the first region coefficients are within the predetermined range;
- a flag information setter to set first flag information indicating that all of the first region coefficients are within the predetermined range or second flag information indicating that at least one of the first region coefficients is not within the predetermined range, in response to the result of determination by the coefficient range determiner; and
- a bit depth determiner to determine the second bit depth in response to the first flag information set by the flag information setter.

17. The apparatus of claim 16, wherein the bit depth determiner determines the second bit depth according to a type of division mode for dividing the one-dimensional conversion block into the first region where at least one of the coefficients of the one-dimensional conversion block is not "0" and the second region where all of the coefficients of the one-dimensional conversion block are "0."

18. The apparatus of claim 16, wherein the bit depth determiner determines a specific bit depth as the second bit depth.

19. The apparatus of claim 3, wherein the one-dimensional block-encoding unit further comprises a bit depth resetter to reset the first bit depth indicating the number of bits used to binarize the coefficients of the one-dimensional conversion block.

20. The apparatus of any one of claim 1, wherein the one-dimensional block-decoding unit comprises:
- a bit depth decoder to decode information of the first bit depth indicating the number of bits used to binarize the coefficients of the one-dimensional conversion block when the transformed and quantized one-dimensional block is defined as the one-dimensional conversion block;
- a coefficient decoder to decode information of the bits streams for the coefficients of the one-dimensional conversion block; and
- a second inverse quantizer and inverse transformer to inversely quantize and to inversely transform the coefficients of the decoded one-dimensional conversion block.

21. The apparatus of claim 20, wherein the coefficient decoder decodes the coefficients of the one-dimensional conversion block having the bit streams generated using the variable length coding method.

22. The method of claim 20, wherein the second inverse quantizer and inverse transformer inversely transforms the coefficients of the one-dimensional conversion block using the Hadamard transform method.

23. The apparatus of claim 20, wherein the one-dimensional block-decoding unit further comprises a mode decoder to decode information of bit streams for the division mode for dividing the one-dimensional conversion block into the first region where at least one of the coefficients of the one-dimensional conversion block is not "0" and the second region where all of the coefficients of the one-dimensional conversion block are "0."

24. The method of claim 23, wherein the one-dimensional block-decoding unit further comprises a flag information decoder to decode bit streams for the first flag information indicating that all of the first region coefficients are within the predetermined range or bit streams for the second flag information indicating that at least one of the first region coefficients is not within the predetermined range.

25. The apparatus of claim 20, wherein the one-dimensional block-decoding unit further comprises a second RGB signal decoder to decode the RGB signal of the inversely quantized and inversely transformed one-dimensional conversion block.

26. The apparatus of claim 20, wherein the one-dimensional block-decoding unit further comprises a second spatial prediction compensator to compensate for the spatially predicted pixel values of the inversely quantized and inversely transformed one-dimensional conversion block.

27. The apparatus of claim 26, wherein the second spatial prediction compensator compensates for the spatially predicted pixel values using only the pixel values of the blocks in a row above a row where the one-dimensional block is, among the blocks spatially adjacent to the one-dimensional block.

28. A dynamic capacitance compensation method for a liquid crystal display, the method comprising:
- (a) reading pixel values of an image in line units, dividing the pixel values of the read image into one-dimensional blocks in predetermined pixel units, transforming and quantizing the one-dimensional blocks, and generating bit streams;
- (b) storing the generated bit streams in a computer readable memory;
- (c) inversely quantizing and inversely transforming the bit streams stored in the memory and decoding the inversely quantized and inversely transformed bit streams; and
- (d) detecting a compensation pixel value for each pixel based on a difference between each pixel value of a current frame and each pixel value of a previous frame.

29. The method of claim 28, further comprising:
- temporarily storing the generated bit streams and, when the generated bit streams are accumulated to become a bit stream of a predetermined size, outputting the bit stream of the predetermined size to the memory, after the operation (a); and
- receiving and temporarily storing the bit stream of the predetermined size stored in the memory and outputting the temporarily stored bit stream of the predetermined size in one-dimensional block units, after the operation (b).

30. The method of any one of claim 28, wherein the operation (a) comprises:
- (a1) transforming and quantizing pixel values of each one-dimensional block; and
- (a2) generating bit streams for a one-dimensional conversion block when a transformed and quantized one-dimensional block is defined as the one-dimensional conversion block.

31. The method of claim 30, wherein, in the operation (a1), the pixel values of each one-dimensional block are transformed using a Hadamard transform method.

32. The method of claim 30, wherein the operation (a) further comprises (a3) spatially predicting pixel values of a one-dimensional block using blocks spatially adjacent to the one-dimensional block and proceeding to the operation (a1).

33. The method of claim 32, the operation (a3) comprises:
- (a31) determining a spatial prediction direction using only pixel values of blocks in a row above a row where the one-dimensional block is, among the blocks spatially adjacent to the one-dimensional block;
- (a32) filtering the pixel values of the blocks in the row above the row where the one-dimensional block is, which are used to spatially predict the one-dimensional block; and (a33) spatially predicting the pixel values of the one-dimensional block using only the blocks in the row above the row where the one-dimensional block is.

34. The method of claim 33, wherein, in the operation (a31), a sum of differences between the pixel values of the one-dimensional block and the pixel values of the blocks in the row above the row where the one-dimensional block exists is calculated for each of R, G and B components and a prediction direction having a minimum sum among sums of the sums of the differences for the RGB components is determined as the spatial prediction direction.

35. The method of claim 33, wherein, when each spatial prediction direction is identified as a prediction direction mode, in the operation (a2), bit streams for identification information of the prediction direction mode are generated using a variable length coding method.

36. The method of claim 30, wherein the operation (a) further comprises (a4) removing redundant information from R, G and B pixel values, encoding an RGB signal without the redundant information, and proceeding to the operation (a1).

37. The method of claim 30, wherein the operation (a) further comprises (a5) determining a division mode for dividing the one-dimensional conversion block into a first region where at least one of coefficients of the one-dimensional conversion block is not "0" and a second region where all of the coefficients of the one-dimensional conversion block are "0" after the operation (a1) and proceeding to the operation (a2), and in the operation (a2), bit streams for first region coefficients corresponding to coefficients of the first region are generated according to the determined division mode.

38. The method of claim 37, wherein, in the operation (a2), bit streams are generated only for identification information of the division mode when all of the coefficients of the one-dimensional conversion block are "0."

39. The method of claim 37, wherein, in the operation (a2), bit streams for the pixel values of the one-dimensional block are generated when a total number of bits used to generate bit streams for the first region coefficients is at least equal to a total number of bits used to generate the bit streams for the pixel values of the one-dimensional block.

40. The method of claim 37, wherein, in the operation (a2), bit streams for the coefficients of the one-dimensional conversion block are generated using a variable length coding method.

41. The method of claim 40, wherein in the operation (a2), the first region coefficients are divided into a first coefficient and coefficients excluding the first coefficient and then bit streams for the first region coefficients are generated using the variable length coding method.

42. The method of claim 30, wherein the operation (a) further comprises (a6) determining a second bit depth indicating a number of bits used to binarize the first region coefficients according to whether all of the first region coefficients are within a predetermined range after the operation (a1) and proceeding to the operation (a2).

43. The method of claim 42, wherein the operation (a6) comprises:

(a61) determining whether all of the first region coefficients are within the predetermined range;

(a62) setting first flag information indicating that all of the first region coefficients are within the predetermined range, when all of the first region coefficients are within the predetermined range;

(a63) determining the second bit depth in response to the set first flag information; and (a64) setting second flag information indicating that at least one of the first region coefficients is not within the predetermined range, if not all of the first region coefficients are within the predetermined range.

44. The method of claim 43, wherein, in the operation (a63), the second bit depth is determined according to a type of division mode for dividing the one-dimensional conversion block into the first region where at least one of the coefficients of the one-dimensional conversion block is not "0" and the second region where all of the coefficients of the one-dimensional conversion block are "0."

45. The method of claim 43, wherein the operation (a63), a specific bit depth is determined as the second bit depth.

46. The method of claim 30, wherein the operation (a) further comprises resetting the first bit depth indicating the number of bits used to binarize the coefficients of the one-dimensional conversion block.

47. The method of any one of claim 28, wherein the operation (c) comprises:

(c1) decoding information of the first bit depth indicating the number of bits used to binarize the coefficients of the one-dimensional conversion block when the transformed and quantized one-dimensional block is defined as the one-dimensional conversion block;

(c2) decoding information of the bits streams for the coefficients of the one-dimensional conversion block; and (c3) inversely quantizing and inversely transforming the coefficients of the decoded one-dimensional conversion block.

48. The method of claim 47, wherein, in the operation (c2), the coefficients of the one-dimensional conversion block having the bit streams generated using the variable length coding method are decoded.

49. The method of claim 47, wherein, in the operation (c3), the coefficients of the one-dimensional conversion block are inversely transformed using the Hadamard transform method.

50. The method of claim 47, wherein the operation (c) further comprises (c4) decoding information of bit streams for the division mode for dividing the one-dimensional conversion block into the first region where at least one of coefficients of the one-dimensional conversion block is not "0" and the second region where all of the coefficients of the one-dimensional conversion block are "0" after the operation (c1), and proceeding to the operation (c2).

51. The method of claim 50, wherein the operation (c) further comprises (c5) decoding bit streams for the first flag information indicating that all of the first region coefficients are within the predetermined range or bit streams for the second flag information indicating that at least one of the first region coefficients is not within the predetermined range after the operation (c4), and proceeding to the operation (c2).

52. The method of claim 47, wherein the operation (c) further comprises (c6) decoding the RGB signal of the inversely quantized and inversely transformed one-dimensional conversion block after the operation (c3).

53. The method of claim 47, wherein the operation (c) further comprises (c7) compensating for the spatially predicted pixel values of the inversely quantized and inversely transformed one-dimensional conversion block after the operation (c3).

54. The method of claim 53, wherein, in the operation (c7), the spatially predicted pixel values are compensated for using only the pixel values of the blocks in a row above a row where the one-dimensional block is, among the blocks spatially adjacent to the one-dimensional block.

55. A method of improving a response time of a liquid crystal display using dynamic capacitance compensation, the method comprising:

(a) reading pixel values of an image in line units, dividing the read pixel values into one-dimensional blocks in predetermined pixel units, transforming and quantizing the one-dimensional blocks, and generating bit streams;

(b) storing the generated bit streams in a computer readable memory;

(c) inversely quantizing and inversely transforming the stored bit streams and decoding the inversely quantized and inversely transformed bit streams; and (d) detecting a compensation pixel value for each pixel of the decoded bit streams based on a difference between each pixel value of a current frame and each pixel value of a previous frame.

56. The method of claim 55, further comprising storing the detected compensation values in a lookup table.

* * * * *